US011308503B2

United States Patent
Hutchings et al.

(10) Patent No.: US 11,308,503 B2
(45) Date of Patent: Apr. 19, 2022

(54) SYSTEM AND METHOD FOR PROVIDING CROWD SOURCED METRICS FOR NETWORK CONTENT BROADCASTERS

(71) Applicant: TuneIn, Inc., Palo Alto, CA (US)

(72) Inventors: Thomas Hutchings, Palo Alto, CA (US); Kristin George, Palo Alto, CA (US)

(73) Assignee: TUNEIN, INC., Palo Alto, CA (US)

( * ) Notice: Subject to any disclaimer, the term of this patent is extended or adjusted under 35 U.S.C. 154(b) by 575 days.

(21) Appl. No.: 14/215,046

(22) Filed: Mar. 16, 2014

(65) Prior Publication Data
US 2014/0289000 A1    Sep. 25, 2014

Related U.S. Application Data

(60) Provisional application No. 61/799,673, filed on Mar. 15, 2013.

(51) Int. Cl.
*G06Q 30/00*    (2012.01)
*G06Q 30/02*    (2012.01)

(52) U.S. Cl.
CPC .............................. *G06Q 30/0201* (2013.01)

(58) Field of Classification Search
CPC ........... G06Q 30/0255; G06Q 30/0235; G06Q 10/105; G06Q 10/103; G06Q 10/067;
(Continued)

(56) References Cited

U.S. PATENT DOCUMENTS 8,768,867 B1 *   7/2014   Thaeler ............... G06Q 30/02
                                              706/12
8,938,748 B1 *   1/2015   Mirisola ............... H04H 60/32
                                              725/10
(Continued)

FOREIGN PATENT DOCUMENTS

AU          2013203768 A1 *   9/2014    ....... H04N 21/44227

OTHER PUBLICATIONS

Bapat et al., Media consumption across platforms: Identifying user-defined repertoires, New media & society, 2012 (Year: 2012).*
(Continued)

*Primary Examiner* — Patricia H Munson
*Assistant Examiner* — Uche Byrd
(74) *Attorney, Agent, or Firm* — Polsinelli PC

(57) ABSTRACT

A system and method for providing crowd sourced metrics for broadcast content providers. For determinations of such metrics, user consumption of broadcast content in multiple streams by multiple content providers may be monitored and user consumption information regarding the broadcast content may be obtained. One or more content consumption metrics may be determined to quantify individual user consumption of the broadcast content. Audience metrics may be determined, for a content provider, to inform about users that are available to consume broadcast content provided by the content provider. Events within the broadcast content may be determined and event information regarding individual user consumption of the broadcast content at the event may be obtained. Event metrics may be determined based on the obtained event information to inform about consumption of the broadcast content at the event by users.

15 Claims, 4 Drawing Sheets

(58) Field of Classification Search
CPC .. G06Q 30/02; G06Q 10/06315; G06Q 40/00; G06Q 30/00; G06Q 30/06; H04Q 7/20
See application file for complete search history.

(56) References Cited

U.S. PATENT DOCUMENTS

| | | | |
|---|---|---|---|
| 2002/0010621 A1* | 1/2002 | Bell | G06Q 30/02 |
| | | | 705/14.11 |
| 2007/0136753 A1* | 6/2007 | Bovenschulte | H04N 21/422 |
| | | | 725/46 |
| 2008/0133767 A1* | 6/2008 | Birrer | H04L 65/4076 |
| | | | 709/231 |
| 2010/0115060 A1 | 5/2010 | Julia et al. | |
| 2010/0125884 A1 | 5/2010 | Howcroft | |
| 2012/0215903 A1* | 8/2012 | Fleischman | G06Q 30/0201 |
| | | | 709/224 |
| 2014/0282717 A1 | 9/2014 | Hutchings et al. | |
| 2015/0264415 A1 | 9/2015 | Hutchings et al. | |

OTHER PUBLICATIONS

Notice of Allowance for U.S. Appl. No. 14/215,040, dated Jul. 22, 2015, 15 pages.
Non-Final Office Action for U.S. Appl. No. 14/215,040, dated Feb. 20, 2015, 17 pages.

* cited by examiner

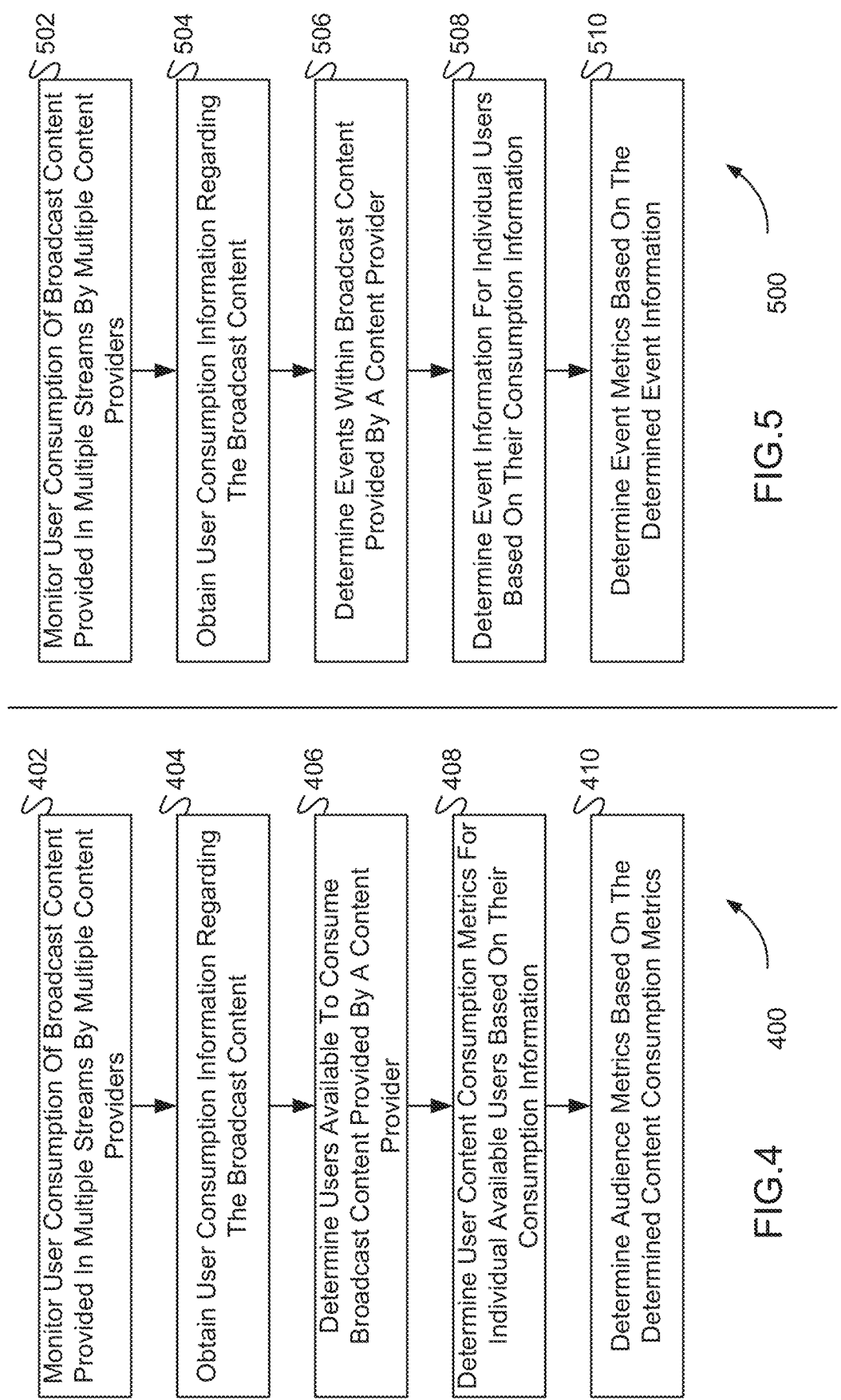

SYSTEM AND METHOD FOR PROVIDING CROWD SOURCED METRICS FOR NETWORK CONTENT BROADCASTERS

CROSS-REFERENCES TO RELATED APPLICATIONS

This application claims the benefit of U.S. Provisional Application 61/799,673, filed Mar. 15, 2013, and titled "SYSTEM AND METHOD FOR PROVIDING CROWD SOURCED METRICS FOR NETWORK CONTENT BROADCASTERS," the disclosure of which is hereby incorporated by reference in its entirety and for all purposes.

BACKGROUND

This disclosure relates to providing network content broadcasters crowd sourced metrics.

Systems that provide content providers with analysis of consumption of broadcast content are known. Typically, such analysis is restricted to taking what is known about participants that agreed to be monitored (usually a limited sample, such as Nielsen households), and then extrapolating this information to the potential audience as a whole. Similarly, any information describing the audience (e.g., demographics, other content consumed, etc.) is also extrapolated from a relatively limited audience sample.

BRIEF SUMMARY

One aspect of the disclosure relates to determining audience metrics for content providers that stream broadcast content over the Internet. Broadcast media, in contrast to on-demand content, may be "pushed" to users. That is, the start and stop times of broadcast media may be determined, or programmed, by a content provider hosting a content stream from which users can choose to consume content at the times programmed by the content provider. On-demand content may include content that is made available to the user, in its entirety, upon request. For example, a set of content available on demand can be accessed at the discretion of the user from start to finish (e.g., at the time they choose). The audience metrics may be determined based on content consumption information of one or more users that are available to consume broadcast content provided by a content provider. The determined audience metrics may indicate descriptions and/or predictions about the available users: for example, without limitations, a description of top 3 genres consumed by the available users within the last hour, a prediction indicating an amount of the available users that will consume a set of broadcast content should it be streamed by the content provider in the next 5 minutes, and/or other metrics. In some examples, the audience metrics may be determined to account for time-shifting during the user consumption of the broadcast content. Such audience metrics may provide the content providers rich information about the available users and thus guidance for the content providers to determine broadcast content to be streamed.

Another aspect of the disclosure relates to determining event metrics for content providers about events that took place within broadcast content provided by the content providers. The determined event metrics may quantify user consumption of the broadcast content at the events, which may include, but without limitations, streaming of a particular song, songs by a particular artist, appearance of a guest, host and/or any other events that took place within the broadcast content provided by the content providers. One example of such even metrics may indicate a prediction about an amount of users that stopped consuming the broadcast content at an event (e.g., upon or during a streaming of a particular song). In some examples, the event metrics may be determined to account for time-shifting during the user consumption of the broadcast content. Such event metrics may provide the content providers rich information about user consumption of broadcast content at events of interest and thus enable the content providers to determine one or more events that may or may not be streamed within their broadcast content.

A system configured to provide crowd sourced metrics for broadcast content providers may include a server. The server may operate in a client/server architecture with one or more client computing platforms. The client computing platforms may be associated with the users of the virtual space. The server may be configured to execute one or more of a content consumption module, a user module, an available user determination module, a content consumption metrics a content selection module, an audience metrics module, an event determination module, an event information module, an event metrics module, and/or other modules.

The content consumption module may be configured to obtain user consumption information by monitoring individual user consumption of broadcast content streamed over the Internet in multiple streams from multiple content providers. This may involve monitoring user consumption of broadcast content at any given time. The obtained user consumption information may comprise segment information indicating description about the broadcast content consumed by the user, segment(s) of the broadcast content consumed by a user, time-shift information indicating time-shift(s) of the user consumption of the broadcast content, context information indicating a context in which the user consumed the broadcast content, geolocation information indicating a location from which the user consumed the broadcast content, device information about a user device to which the broadcast content is streamed, user status information, and/or any other information regarding user consumption of the broadcast content. In some implementations, some or all of the obtained user consumption information may be stored in a database to facilitate historical views of individual user consumption of broadcast content over one or more periods of time. In some implementations, some or all of the obtained user consumption information may be stored in memory storage transiently for fast access by other modules of the system—for example, by the available user determination module.

A user module may be configured to manage user accounts associated with individual users. Individual user information may be included in the user accounts. The individual user information may comprise content consumption metrics quantifying individual user consumption of broadcast content monitored by the content consumption module.

The available user determination module may be configured to determine users that are available to consume broadcast content streamed by the content providers. The availability of a user for such broadcast content may be determined based on user parameters, such as, but not limited to, the user online/offline status, the user device screen status, a duration of screen on or off in a period (e.g., within last 10 minutes, 20 minutes, last half an hour, last hour, etc.), the user selections of broadcast content, a language spoken by the user, a level of device usage by the user and/or any other user parameters. In some implementations, these user parameters may be readily determined from the individual user information such as the user consumption information determined by the content consumption module. In some implementations, the determinations of the available users may involve comparing the obtained user parameters with one or more thresholds. In some implementations, the available user determination module may be configured to determine a group of available users. For example, it may be determined by the available user determination module that there is a group of users within an age group of 20-40 year old available to consume the broadcast content.

Content consumption metrics module may be configured to determine one or more content consumption metrics quantifying individual user consumption of broadcast content based on the user consumption information obtained by the content consumption module. The determined consumption metrics may describe individual user consumption of broadcast content in a past (e.g., within the last hour, last 24 hours, last month, last year, and so on), and/or predict individual user consumption of broadcast content in a future (e.g., within the next 5, 10, 15, 20, 30, hour, two hours, and so on).

In some examples, the content consumption metrics for a user may include metrics indicating, for example, but not limited to, top songs, artists, genres, hosts, guests, personalities and/or other entities that the user has consumed in the past. Other examples of content consumption metrics for a user may include metrics indicating a context in which the user consumed the broadcast content(e.g., indicating that the user consumed the broadcast content in a stream that pushed the broadcast content to the user, or that the user determined the broadcast content first and then selected the stream), average duration of a song, talk show, news and/or sports events the user has consumed in a period, number of songs, talk shows, news programs, and/or sports events the user consumed in the past, a consumption pattern of the user in the past, duration of the user device screen on time/off time during the consumption, number of times the user switch the screen from on to off and vice versa, device usage level during the consumption, locations from which the user consumed the broadcast content, and/or any other descriptive content consumption quantifying individual content consumption.

In some examples, the content consumption metrics for a user may include metrics indicating a likelihood that the user will or will not consume broadcast content in a stream within a future period, an estimated duration that the user will stay in the stream to consume the broadcast content within the future period, a likelihood that the user will switch from a current stream to another stream within the future period, a likelihood that a user will turn on or turn off the user screen device during the streaming of the broadcast content, and/or any other predictive consumption metrics for the user. In some examples, the content consumption metrics may be determined based on information regarding broadcast content selections as obtained by the content consumption module, user preferences, and/or user device usage.

The content selection module may be configured to obtain information regarding broadcast content selections made by a user. Such user selection information may indicate consumption of specific broadcast content in a stream by a user within a period. In some examples, the user content selection information may be obtained by analyzing user consumption information obtained by the content consumption module, such as the segment information, context information, user device information and/or other information included in the user consumption information.

The audience metrics module may be configured to determine audience metrics for a content provider. The determined audience metrics may provide the content provider information about available users to consume broadcast content by the content provider, as determined by the available user determination module, and may enable the content provider to determine a set of broadcast content to be streamed in a stream in order to increase audience-ship for that stream. Such audience metrics may be determined based on content consumption metrics determined for the individual available users. The determinations may involve statistics methods such as scaling, aggregation, standard deviation, summarizing, categorizing, regression, standard deviation, neural networks, machine learning, and/or any other statistical methods to determine audience metrics.

One example of the audience metrics is a metric that indicates, for a content provider, a prediction about an amount of available users will consume a set of broadcast content should the content provider stream the set of broadcast content in a future period (e.g., the next 1, 3, 5, 10, 20, 30 minutes, hour, day, month, year, and so on). Other examples of the audience metrics may include metrics indicating an amount of available user that will switch from other streams to a stream provided by the content provider within a future period, a total duration of on-time of the device screens associated with the available users within the future period, an amount of the available users that will switch off of the stream provided by the content provider within the future period, a total duration that the available users will stay in the stream within the future period should the content provider stream a set of broadcast content within in the future period, and/or any other audience metrics.

The event determination module may be configured to determine events within broadcast content streamed over the Internet by content providers. Such events may include, but not limited to, streaming of a song, streaming of songs of a genre, streaming of songs by an artist, an appearance of a guest, an appearance of a host, or a commercial break, and/or any other events that may take place within the broadcast content. In some examples, the content provider of the broadcast content may provide metadata, ID tags, headers, signals, and/or any other identity information about the broadcast content. In these examples, the events may be determined by detecting such identity information provided in the streaming by the content provider. In some other examples, the event determination may involve recognition methods for determining events within the broadcast content, such as, but not limited to, voice recognition, image analysis, motion detection, signal detection, and/or any other methods that may be used to automatically recognize the identities of events within the broadcast content.

The event information module may be configured to obtain event consumption information indicating user consumption of broadcast content at the events determined by the event determination module. The determined event consumption information may indicate individual user consumption of the broadcast content at (i.e., upon or during) the determined events, such as, but not limited to, user stream status, user device screen status, user geolocation, user activities on the user device, and/or any other information for individual users at the determined events. In some examples, for such determinations, the event determination module may be configured to obtain content consumption metrics for individual users at the events. In those examples, the event information determinations may involve corresponding the determined events to the obtained user content consumption metrics according to common time occurrences. In some examples, event information module may be configured to dynamically obtain content consumption information for individual users at the determined events within the broadcast content.

The event metrics module may be configured to determine event metrics for the events based on the event information obtained by event information module. The determined event metrics may quantify user consumption of the broadcast content in which the event took place on an event level. Examples of the determined event metrics may include, metrics indicate an amount of users that joined or left the stream at the event or at specific segments of the event, an amount of users that shared and/or liked the event on social media, emailed about the event, and/or other user actives related to the event during the streaming of the broadcast content in which the event took place, a total duration of on-time of screens of devices associated users that stayed in the stream at the event, an amount of users that moved to a commercial establishment at the event (e.g., during a talk show in which the commercial establishment is mentioned), an amount of users that ran an application on their devices at the event (e.g., an event of a talk show in which the application is mentioned), and/or any other event metrics. Such event metrics may be provided to the content provider that streamed the events to guide the content provider to make a decision of those events in future streaming of broadcast content.

In some examples, the event metrics module may be configured to determine event metrics based on event information for individual users as obtained by the event information module using methods, such as, but not limited to, scaling, aggregating, summarizing, probability testing, neural networks, machine learning and/or any other methods that may be used to determine event metrics based on event information for individual users. In some examples, the event metrics module may be configured to determine event metrics for a group of users, as determined by the user module, at the events.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 4 illustrates one exemplary method of providing crowd sourced metrics for broadcast content providers in accordance with the disclosure.

FIG. 5 illustrates another exemplary method of providing crowd sourced metrics for broadcast content providers in accordance with the disclosure.

DETAILED DESCRIPTION

Figure 1:
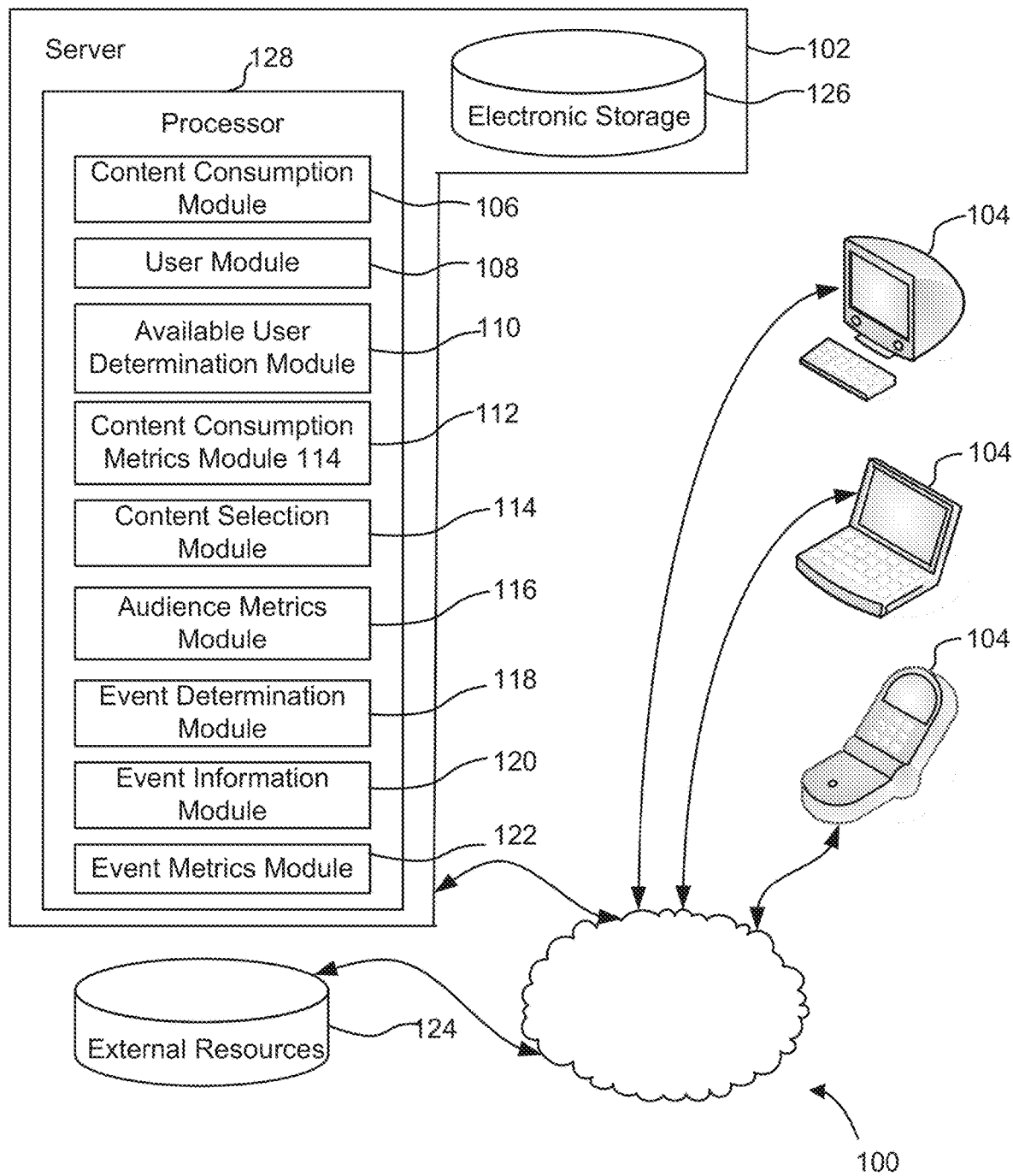
FIG. 1 illustrates one example of a system configured to provide crowd sourced metrics for broadcast content providers.

FIG. 1 illustrates one example of a system configured to provide crowd sourced metrics for broadcast content providers. Content such as songs, talk shows, news programs, sports events (e.g., live games) and/or any other content may be broadcasted to one or more users. In some examples, content providers may provide one or more sets of such broadcast content to the users over the Internet through streaming. A set of broadcast content may include one or more of songs, talk shows, news programs, sports events, and/or any content in an order by which the set of broadcast content may be consumed by the users temporally. Information regarding user consumption of broadcast content may be obtained at any given time. One or more content consumption metrics may be determined, based on the obtained user consumption information, to quantify individual user consumption of the broadcast content. One or more audience metrics may be determined based on content consumption metrics for users available to consume broadcast content. In one example, the determined audience metrics may indicate a predication of an amount of users that will consume a set of broadcast content should the content provider stream the set of broadcast content.

Event information regarding user consumption of broadcast content at events that took place within broadcast content may be obtained. Examples of such events include, but not limited to, streaming of a particular song, songs by a particular artist, appearance of a guest, host and/or any other events. Event metrics quantifying user consumption of broadcast content at such events may be determined based on the obtained event information. In one example, the determined event metrics may indicate an amount of users that joined or left a stream at an event within broadcast content. As such, the audience metrics and the event metrics may provide content providers rich information about user consumption of broadcast content streamed by the content providers. This may guide the content providers to determine broadcast content to be streamed to the users.

In some implementations, system 100 may include a server 102. The server 102 may be configured to communicate with one or more client computing platforms 104 according to a client/server architecture. The users may access system 100 and/or the virtual space via client computing platforms 104. Server 102 may be configured to execute one or more computer program modules. The one or more computer program modules may include one or more of a content consumption module 106, a user module 108, an available user determination module 110, a content consumption metrics module 112, a content selection module 114, an audience metrics module 116, an event determination module 118, an event information module 120, an event metrics module 122, and/or other modules.

The content consumption module 106 may be configured to obtain user consumption information by monitoring individual user consumption of broadcast content streamed over the Internet in multiple streams from multiple content providers. Content such as songs, talk shows, news programs, sports events (e.g., live games) and/or any other content may be broadcast to one or more users via Internet streaming by content providers. A user may consume such broadcast content by, e.g., listening to, re-broadcasting, and/or viewing the broadcast content. Information regarding individual user consumption of broadcast content may be obtained by monitoring the user consumption of the broadcast content at any given time. Such monitoring may include monitoring the user consumption of broadcast content in a stream, which may involve monitoring a location, device usage, stream selection(s), broadcast content selection(s), and/or any other information regarding the user during streaming of broadcast content by the content provider. In a non-limiting example for illustration only, 10 streams (e.g., stations) of broadcast content (e.g., music shows, talk shows, sports games, news and/or other content), at a time T, may be provided by multiple content providers; individual user activities related to those 10 streams of broadcast content, at the time T, such as switching to a stream, leaving a stream, switching to a stream from another stream, staying in a stream for a period of time, turning on or off screens of a device to which broadcast content is streamed, and/or any other user activities may be monitored. Such monitored individual user consumption of the broadcast content may be analyzed to obtain user consumption information regarding the broadcast content.

The obtained user consumption information may comprise, for example, but not limited to, segment information indicating segment(s) of the broadcast content consumed by the user. The segment information may be obtained, for example, by determining segment(s) within the broadcast content during which the user consumed the broadcast content, the locations of those segments (e.g., as measured by a starting time and/or an end time within a song, talk show, news program, and/or any other broadcast content), duration of those segments, and/or any other segment information regarding segments of the broadcast content consumed by the user.

The obtained user consumption information may comprise description about the broadcast content consumed by the user. In some examples, the streaming of broadcast content consumed by the user may provide identification information about the broadcast content, such as, but not limited to titles (e.g., song title, talk show name, etc.), the language of the broadcast content, performing artists, hosts of a talk show, guests of the talk show, a genre of the broadcast content, and/or any other information describing the broadcast content being consumed by the user. Such identification information about the broadcast content consumed by the user may be obtained from the streaming of the broadcast content, e.g., via metadata, headers, or tags embedded in the streaming. In some examples, the description about the broadcast content consumed by the user may be determined by content recognition methods, such as, but not limited to, voice recognition, image analysis, signal detection, motion detection, and/or any other content recognition methods.

The obtained user consumption information may comprise time-shift information indicating one or more time-shifts during the user consumption of the broadcast content. Such time-shift information may be obtained, for example, by determining one or more time periods during which the user consumed the broadcast content. For instance, it may be determined that the user paused a streaming of a song for 3 minutes, resumed the streaming, paused the streaming for another 2 minutes, and resumed the streaming until the end of the song. In another instance, it may be determined that the song was streamed to the user device and stored on the user device at time T; and the user played back the song 2 hours after the time T.

The obtained user consumption information may comprise context information indicating a context in which the user consumes the broadcast content. Such context information may be obtained, for example, by analyzing user's consumption of other broadcast content leading to the consumption of the current broadcast content. For instance, the context information may indicate that the user was listening to a news program, then a talk show, before switching to a stream broadcasting a song having political symbols. In another instance, the context information may indicate that the user consumed a song in a stream that pushed the song to the user; or the user consumed the song by determining the song first (e.g., through searching and/or browsing for the song), determining a stream in which the song was streamed (e.g., through searching and/or browsing stream information that indicates the song would be streamed), and selecting the determined stream.

The obtained user consumption information may include geolocation information indicating a location from which the user consumes the broadcast content. In some implementations, such geolocation location information regarding the users may be obtained from client devices associated with the users, such as the client devices 104 as illustrated. The geolocation information obtained from the client devices 104 may specify the physical locations of client devices 104. The geolocation information may include one or more of Internet protocol address, MAC address, RFID information, Wi-Fi connection location, Global Positioning System coordinates, radio frequency triangulation information, information entered to client device 104 by a user (e.g., specifying the location of client 104), and/or other information that may identify a real world location. The content consumption module 106 may be configured to obtain geolocation information of one or more of client device 104 in a substantially ongoing manner (e.g., at a sampling rate), at discrete intervals, responsive to user selection or input, and/or according to other schemes. The content consumption module 106 may be configured to obtain geolocation information that has been transmitted wirelessly from client devices 104. The content consumption module 106 may be configured to obtain geolocation information that has been stored at client devices 104 for transmission to user geolocation module 108 at a later time (e.g., when docked to a computer). The content consumption module 106 may be configured to manage storage of geolocation of client devices 104. This may facilitate determination of the geolocation of one of client device 104 at some previous time.

The obtained user consumption information may comprise device information about a user device to which the broadcast content is streamed. Such device information may indicate, for example, screen status of the use device (e.g., Is the screen currently on or off? How long did the screen remain off or on during the streaming? How many times did the screen status change, from on to off or vice versa, during the streaming?), battery usage of the device, processor load of the device, memory usage of the device, other running applications on the device, and/or any other device information.

The obtained user consumption information may comprise user status information indicating individual user status during a streaming of broadcast content. Such user status information may indicate, for example, without limitations, user online/offline status, user engagement status (e.g., working in other application while consuming the broadcast content), state of the user device (e.g., on or off) and/or any other user status information. Such user status information may be obtained from a user device associated with the user. For example, the power-on or off status of the device may be obtained from a processor of the user device; the user online or offline status may be determined through connection information associated with the user device and registered at system 100; and the user engagement information may be determined through the session information associated with the user and registered at system 100.

It should be understood that the above examples of user consumption information regarding user consumption of broadcast content are described for illustration purposes only and thus not intended to be limiting. One of ordinary skill in the art will recognize the user consumption information regarding user consumption of broadcast content may comprise any other information.

In any case, the user consumption information obtained by the content consumption module 106 may be stored in the electronic storage 126 to be accessed by other modules in the system 100, e.g., the content consumption metrics module 112, available user determination module 110, and the event metrics module 122. In some examples, some or all of the obtained user consumption information may be organized in a database and stored permanently in the electronic storage 126. In some example examples, some or all of the obtained user consumption information may be stored in the electronic storage 126 transiently (e.g., the electronic storage 126 may include memory storage). In some implementations, the obtained user consumption information such as the segment information, context information, and/or description about the broadcast content consumed by individual users may be stored in the database permanently. These kinds of user consumption information may be organized to be associated with corresponding users in one or more time series to facilitate historical views of individual users' consumption of broadcast content over one or more periods of time. The obtained user consumption information such as the device information and/or geolocation information, on the other hand, may be stored in memory storage transiently for fast access by other modules of system 100.

The user module 108 may be configured to manage user accounts associated with individual users. Individual user information may be included in the user accounts and may include information stored by server 102, one or more of the client computing platforms 104, and/or other storage locations. The user information may comprise content consumption metrics quantifying individual user consumption of broadcast content monitored by the content consumption module 106. Other examples of user information include information identifying users (e.g., a username or handle, a number, an identifier, and/or other identifying information) within the virtual space security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The available user determination module 110 may be configured to determine users that are available to consume broadcast content streamed over the Internet by the content providers. For such determinations, individual user information may be accessed through the user module 108. One or more user parameters may be obtained from the individual user information and may be used to determine whether a user is available to consume broadcast content provided by a content provider. Such an availability of a user may be determined based on the user parameters, such as, but not limited to, the user online/offline status, but not limited to, the user online/offline status, the user device screen status, a duration of screen on or off in a period (e.g., within last 10 minutes, 20 minutes, last half an hour, last hour, etc.), the user selections of broadcast content, a language spoken by the user, a level of device usage by the user and/or any other user parameters. In some implementations, these user parameters may be readily determined from the individual user information such as the user consumption information described above. For example, the user consumption information may indicate that a user U1 is online and is actively listening to alternative rock songs in a stream S1 provided by a content provider P1. A set of user parameters for user U1 may be obtained from this consumption information of user U1: i.e. status: online, device: on, screen: on selection: stream S1 by P1. In another example, the user consumption information may indicate that a user U2 is online, listening to country songs in a stream S2 provided by a content provider P2 with screen off. In that example a set of user parameters may be determined from the user U2 consumption information: i.e. status: online, device: on, device screen: off, and selection: S2 by P2.

In some implementations, the determinations of the available users may involve comparing the obtained user parameters with one or more thresholds. For example, a threshold may be established such that so long as the user status indicates the user is online, the user is available to consume broadcast content provided by a content provider. In another example, more than one threshold may be established such that the obtained user parameters should breach all of the thresholds for a determination that the user is available to consume broadcast content. For example, the available user determination module 110 may be configured such that a user is determined as available to consume broadcast content in a stream only when the user parameters indicate the user device screen is on and the user is currently listening to broadcast content in a stream provided by content provider P1. Accordingly, in the examples above where users U1 and U2's consumption information is determined, user U1 may be determined as available, but user U2 may be determined as unavailable. It should be understood that the above examples of determining individual user availability to consume broadcast content to be provided a content provider are described for illustration purposes only and thus not intended to be limiting. One of ordinary skill in the art may recognize there are various ways and/or standards for determining such user availability.

In some implementations, the available user determination module 110 may be configured to determine a group of available users for broadcast content to be streamed. Such a group may be determined based on, for example, without limitations, a common geolocation, a common language spoken, one or more common preferences shared by, a common income level, a common age group, one or more songs, artists, genres, listened most as indicated by the user consumption information, and/or any other common characteristics of the group of available users. For example, the available user determination module 110 may determine there is a group of available users from China who are currently listening to various songs in different streams; there is a group of available users that are within an age group of 20-40 year old; there is a group of available users who have listened an artist 80% of time when they are online; and so on.

Content consumption metrics module 112 may be configured to determine one or more content consumption metrics quantifying individual user consumption of broadcast content based on the user consumption information obtained by the content consumption module 106. The determined consumption metrics may include metrics that describe individual user consumption of broadcast content in a past (e.g., within the last hour, last 24 hours, last month, last year, and so on), and may include metrics that predict individual user consumption of broadcast content in a future (e.g., within the next 5, 10, 15, 20, 30, hour, two hours, and so on). The descriptive content consumption metrics for a user may include metrics indicating, for example, but not limited to, top songs, artists, genres, hosts, guests, personalities and/or other entities that the user has consumed in the past. For instance, such a descriptive metric may indicate top 10 songs in all broadcast content that have been consumed by the user in the last month; top songs by 3 artists that have been consumed by the user in the last 24 hours; and so on. In another example, the determined descriptive content consumption metrics may indicate a context in which the user consumed the broadcast content. E.g., a metric value such as "tuning" may be determined in cases where the obtained user consumption information indicates that the user consumed the broadcast content in a stream that pushed the broadcast content to the user; and a "listening" metric value may be determined in cases where the obtained user consumption information indicates that the user determined the broadcast content first and then selected the stream.

Other examples of descriptive content consumption metrics for a user include metrics indicating average duration of a song, talk show, news and/or sports events the user has consumed in a period, number of songs, talk shows, news programs, and/or sports events the user consumed in the past, a consumption pattern of the user in the past, duration of the user device screen on time/off time during the consumption, number of times the user switch the screen from on to off and vice versa, device usage level during the consumption, locations from which the user consumed the broadcast content, and/or any other descriptive content consumption quantifying individual content consumption.

The descriptive content consumption metrics may be determined from the user consumption information obtained by the content consumption module 106. In some examples, for such determinations, the content consumption metrics module 112 may be configured to employ statistics methods such as categorizing, summarizing, tabulating, distribution analysis, univariate analysis and/or any other statistics methods that may be used to quantify individual consumption of the broadcast content. For example, a number of songs, artists listened, name of the songs, artists, order of the songs listened, genre of the songs listened, total duration of the songs listening, average duration of individual song listening, segments in the songs listened, user device screen status, user device usage level during song listening and/or other content consumption metrics quantifying an individual user consumption of broadcast content in the past hour may be determined from the segment information and user device information included in the user consumption information as determined by the content consumption module 106. In another example, descriptive content consumption metrics such as, top songs, artists, genre, etc., consumed by the user during the user's lifetime registered with the system 100 may be determined from the user consumption information to facilitate historical views of user consumption of broadcast content.

The determined content consumption metrics may include metrics that predict individual user consumption of broadcast content in a future. Such predictive content consumption metrics for a user may be determined from the consumption information obtained by the content consumption module 106. Examples of predictive content consumption metrics for a user may include a likelihood that the user will or will not consume broadcast content in a stream within a future period, an estimated duration that the user will stay in the stream to consume the broadcast content within the future period, a likelihood that the user will switch from a current stream to another stream within the future period, a likelihood that a user will turn on or turn off the user screen device during the streaming of the broadcast content, and/or any other predictive consumption metrics for the user.

In some examples, for such determinations, the content consumption metrics module 112 may be configured to employ statistics methods such as regression analysis (e.g., linear regression, discrete regression, logistical regression, probit regression, and/or any other regression analyses), time series analysis (e.g., autocorrelation, trend estimation, seasonal variation, and/or any other time series analyses), survival or duration analysis, machine learning techniques, neural networks, radial basis functions, support vector machines, geospatial predictive modeling, and/or any other statistics methods that may be used to analyze current and/or historical content consumption by an individual user to predict a future content consumption by the individual user.

The determined predictive content consumption metrics may include, for example, a metric indicating a likelihood that an individual user will consume or will not consume a set of broadcast content to be streamed by a content provider. Such a likelihood may be determined, for instance, based on information regarding broadcast content selections made by the user in the last hour as obtained by the content consumption module 106, user preferences, and/or user device usage. The information about content selections made by the user in the last hour may reveal a consumption pattern of the user in the last hour. By way of a non-limiting example to illustrate information about content selections by the user, the user, in one example, may have switched to a stream S1 when a 90s rock song R1 by an artist X was streamed, stayed in the stream S1 until the end of song R1's streaming and switched to a news program when a country song C1 was steamed in the S1 following song R1, switched back to S1 when another 90s rock song R2 also artist X was streamed, stayed in the stream S1 until the end of song R1's streaming and switched to the news program again when a hip-pop son H1 was steamed in the S1 following song R2, and so on. Based on such content selections by the user in the last hour, a consumption pattern about the user's consumption of broadcast content in the last hour may be determined and may indicate that the user switched to stream S1 when 90s songs by artist X were streamed and switched off of stream S1 when other songs were streamed. Based on this information and other user consumption information such as, the current user device usage and user preferences (e.g., 90s rock songs specified as favorite genre by the user), a likelihood e.g., there is more than 50% of chance that the user will switch to the rock song stream provided by the content provider P1 in the next 5 minutes should the content provider P1 stream a 90s hit rock song in the next 5 minutes may be quantified using, for example, time series analysis.

In some examples, in determining the content consumption metrics, the content consumption metrics module 112 may be configured to account for time-shift(s) of the user consumption of the broadcast content determined by the content consumption module 106. For example, in a case where the content consumption module 106 determines that the user consumed the song in a time period or time periods later than the time period in which the song was streamed by the content provider, the content consumption metrics module 112 determines the content consumption metrics based on user consumption of the song during the later time period(s) in which the user actually consumed the song.

Content selection module 114 may be configured to obtain information regarding broadcast content selections made by a user. Such user selection information may indicate consumption of specific broadcast content in a stream by a user within a period. In a non-limiting example as an illustration only, user content selection information for a user U may indicate that the user consumed a classical rock song at a 15th minute mark prior to a current time in stream S1, an alternative rock song at a 11th minute mark prior to the current time in stream S1, a country song at 7th minute mark prior to the current time in stream S2, another classical rock song at a 6th minute mark prior to the current time in stream S1, a heavy metal rock song at a 3rd minute mark prior to the current time in stream S1 and until the current time.

In some examples, such user content selection information may be obtained by analyzing user consumption information obtained by the content consumption module 106, such as the segment information, context information, user device information and/or other information included in the user consumption information. For example, the segment information may provide the content selection module 114 information about segments of user consumption within a period, e.g., during 15th to 7th minute prior to the current time the user stayed in S1, during the 6th minute prior to the current time the user switched to S2 from S1, and during the 5th minute until the current time the user switched back to S1 from S1. Based on this segment information, user selections of broadcast content during the past 15th minute may be determined by juxtaposing stream information of S1 and S2 during the past 15th minute, and the obtained segment information about the user.

It should be understood that the above examples of user selections are described for illustration purposes only and thus are not intended to be limiting. One of ordinary skill in the art will recognize that the information regarding user content selections may include a variety of information about user content selections, such as, but not limited to, artists, genre, talk show, hosts, guests, sports events selected by the user, specific segments within the selected broadcast content during which the user consume the selected broadcast content (e.g., closing argument section in a political talk show featuring debates) and/or any other information indicating any other aspects related to user content selections.

Audience metrics module 116 may be configured to determine audience metrics for a content provider. The determined audience metrics may provide the content provider information about available users to consume broadcast content by the content provider, as determined by the available user determination module 110, and may enable the content provider to determine a set of broadcast content to be streamed in a stream in order to increase audience-ship for that stream. To so facilitate the content provider, the audience metrics may be determined by the audience metrics module 116 to quantify content consumption by the available users in a past and/or provide predictions about content consumption by the available users in a future. Such audience metrics may be determined based on content consumption metrics determined for the individual available users. In some examples where the content consumption metrics are determined to account for time-shifting during the individual available user consumption of the broadcast content, the audience metrics determined based on such content consumption metrics account for the time-shifting accordingly.

In some examples, the audience metrics module 116 may employ statistics methods such as scaling, aggregation, standard deviation, summarizing, categorizing and/or any other statistics methods to determine descriptive audience metrics based on descriptive content consumption metrics for individual available users. In a non-limiting example as an illustration of such audience metrics only, 40 users may be determined by the available user determination module 110 as available to consume broadcast content provided by a content provider P1. In that example, content consumption metrics for those 40 available users may be obtained by the content consumption metrics module 112. The obtained content consumption metrics may indicate that 30 of the 40 available users has consumed rock songs as their number one genre in the past month and 5 of the 40 available users, although did not consume rock songs as their number one genre in the past, has specified that rock as one of their favorite genre in user preferences. Based on such descriptive content consumption metrics for the available users, the audience metrics module 116 may determine that the number one genre favored by the 40 available users is rock.

In some examples, the audience metrics module 116 may employ methods such as scaling, regression, standard deviation, neural networks, machine learning, and/or any other methods that may determine predictions about content consumption by the available users in a future period to determine predictive audience metrics. One example such predictive audience metrics is a metric that indicates, for a content provider, a prediction about an amount of available users will consume a set of broadcast content should the content provider stream the set of broadcast content in a future period (e.g., the next 1, 3, 5, 10, 20, 30 minutes, hour, day, month, year, and so on). Such a predictive audience metric may be determined by the audience metrics module 116, for example, using an averaging method. For instance, the likelihood associated with individual available users that they will consume a set of broadcast content may be aggregated and then averaged to obtain an average likelihood. This average likelihood may be then multiplied by the number of available users to obtain an estimated amount of user that will consume the set broadcast content within the further period. Other examples of the predictive audience metrics may include metrics indicating an amount of available user that will switch from other streams to a stream provided by the content provider within a future period, a total duration of on-time of the device screens associated with the available users within the future period, an amount of the available users will switch off of the stream provided by the content provider within the future period, a total duration that the available users will stay in the stream within the future period should the content provider stream a set of broadcast content with in the future period, and/or any other predictive audience metrics. In some examples, the audience metrics module 116 may be configured to determine audience metrics for a group of available users grouped by, for example, but not limited to, a common geolocation, a common language spoken, a common age group, a common income level, a common demographics, a common education background, a common occupation, and/or any other common user characteristics.

Event determination module 118 may be configured to determine events within broadcast content streamed over the Internet by content providers. One or more events may take place within the broadcast content by content providers. Such events may include, but not limited to, streaming of a song, streaming of songs of a genre, streaming of songs by an artist, an appearance of a guest, an appearance of a host, or a commercial break, and/or any other events that may be streamed with the broadcast content. As such, the determined events may include events within the broadcast content that have durations (e.g., streaming of a song, talk shown, commercial break), and/or events with the broadcast content that took place at discrete point (e.g., an appearance of a guest in a talk show at 7 minute 45 second mark in the show, a mentioning of a product in a talk show at 11 minute 32 second mark and so on). In some examples, the content provider of the broadcast content may provide metadata, ID tags, headers, signals, and/or any other identity information to identify events within the broadcast content, such as, but not limited to, titles of the broadcast content (e.g., song titles, talk show titles) being streamed at a given time, performing artists of the broadcast content, talk show hosts, guests appearance in the broadcast content (e.g., host H is appearing in this segment of the broadcast content, guest G is appearing in that segment of the broadcast content), indication that a product is being mentioned in the broadcast content, indication of commercial breaks being streamed in the broadcast content, and/or any other events that may be streamed within the broadcast content.

In these examples, the event determination module 118 may be configured to determine, e.g., through programing rules, events by matching the broadcast content identification information received from the content provider with a list of events of interest. In some other examples, the event determination module 118 may be configured to automatically recognize the identities of events within the broadcast content through, for example, voice recognition, image analysis, motion detection, signal detection, and/or any other methods that may be used to automatically recognize the identities of events within the broadcast content.

Event information module 120 may be configured to obtain event consumption information indicating user consumption of broadcast content at the events determined by the event determination module. The determined event information may indicate individual user consumption of the broadcast content at (i.e., upon or during) the determined events by the event determination module 118. In some examples, for such determinations, the event determination module 118 may be configured to obtain content consumption metrics for individual users at the events. In some examples, such determinations may involve corresponding the determined events to the user content consumption according to the common time occurrence. For example, for a determined event—e.g., a streaming of a song, the start time and end time of the streaming of the song in a stream may be obtained by the event determination module 118; and user consumption metrics quantifying individual user consumption of the broadcast content in the stream during the starting time and end time of the streaming of the song may be determined: such as, user stream status (i.e., did the user leave the stream or join the stream), user device screen status (i.e., did the user turn on the screen or turn off the screen), user geolocation information (e.g., where was the user in the real world, and did the user start moving to another location e.g., a restaurant advertised in a commercial break), user activities on the user device (e.g., did the user open an application mentioned in talk show), and/or any other metrics for individual users obtained at the determined the event. In some examples where the content consumption metrics are determined to account for time-shifting during the individual available user consumption of the broadcast content, the event information determined based on such content consumption metrics account for the time-shifting accordingly.

In some other examples, event information module 120 may be configured to dynamically obtain content consumption information for individual users at the determined events within the broadcast content. For example, at a determination that a streaming of a song is taking place within the broadcast content of a stream, the event information module 120 may obtain content consumption metrics for those users who are in the stream, such as, user stream status (i.e., did the user leave the stream or join the stream), user device screen status (i.e., did the user turn on the screen or turn off the screen), user's geolocation information (e.g., where was the user in the real world, and did the user start moving to another location e.g., a restaurant advertised in a commercial break), user's activities on the user device (e.g., did the user open an application mentioned in talk show), and/or any other consumption metrics for individual users during the starting time and end time of the streaming of the song.

The event metrics module 122 may be configured determine event metrics for the events based on the event information obtained by event information module 120. The determined event metrics may quantify user consumption of the broadcast content in which the event took place on an event level. Examples of the determined event metrics may include, metrics indicate an amount of users that joined or left the stream at the event or at specific segments of the event, an amount of users that shared and/or liked the event on social media, emailed about the event, a total duration of on-time of screens of devices associated users that stayed in the stream at the event, an amount of users that moved to a commercial establishment at the event (e.g., an event of a talk show in which the commercial establishment is mentioned), an amount of users that ran an application on their devices at the event (e.g., an event of a talk show in which the application is mentioned), and/or any other event metrics. Such event metrics may be provided to the content provider that streamed the events such that the content provider may be enabled to make a decision of those events in future streaming of broadcast content.

In some examples, the event metrics module 122 may be configured to determine event metrics based on event information for individual users as obtained by the event information module 120 using methods, such as, but not limited to, scaling, aggregating, summarizing, probability testing, neural networks, machine learning and/or any other methods that may be used to determine event metrics based on event information for individual users. For example, in a case where the obtained event information indicates that 40 individual users turned on their device screens for periods corresponding to each of the 40 individual users during a streaming of a song (e.g., those users may have turned on their screens to obtain song information), a total duration of the device screen on-time for those 40 users may be determined by aggregating individual periods of the device screen on-time corresponding to the 40 individual users.

In some examples, the event metrics module 122 module may be configured to determine event metrics for a group of users at the events. Such a group may be determined by the user module 108, based on, for example, without limitations, a common geolocation, a common language spoken, one or more common preferences shared by, a common income level, a common age group, one or more songs, artists, genres, listened most as indicated by the user consumption information, and/or any other common characteristics of the group of available users. For example, the event metrics module 122 may determine event metrics for a group of users from China who are at the events; may, simultaneously or alternatively, determine event metrics for a group of users who are within an age group of 20-40 year old; and so on.

The server 102, client computing platforms 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 124 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 124, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

Server 102 may include electronic storage 126, one or more processors 128, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 126 may comprise non-transitory storage media that electronically stores information. The electronic storage media of electronic storage 126 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor 128, information received from server 102, information received from client computing platforms 104, and/or other information that enables server 102 to function as described herein.

Processor(s) 128 is configured to provide information processing capabilities in server 102. As such, processor 128 may include one or more of a digital processor, an analog processor, a digital circuit designed to process information, an analog circuit designed to process information, a state machine, and/or other mechanisms for electronically processing information. Although processor 128 is shown in FIG. 1 as a single entity, this is for illustrative purposes only. In some implementations, processor 128 may include a plurality of processing units. These processing units may be physically located within the same device, or processor 128 may represent processing functionality of a plurality of devices operating in coordination. The processor 128 may be configured to execute modules 106, 108, 110, 112, 114, 116, 118, 120, 122 and/or other modules. Processor 128 may be configured to execute modules 106, 108, 110, 112, 114, 116, 118, 120, 122 and/or other modules by software; hardware; firmware; some combination of software, hardware, and/or firmware; and/or other mechanisms for configuring processing capabilities on processor 128. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 106, 108, 110, 112, 114, 116, 118, 120, 122 are illustrated in FIG. 1 as being implemented within a single processing unit, in implementations in which processor 128 includes multiple processing units, one or more of modules 106, 108, 110, 112, 114, 116, 118, 120, 122 may be implemented remotely from the other modules. The description of the functionality provided by the different modules 106, 108, 110, 112, 114, 116, 118, 120, 122 described below is for illustrative purposes, and is not intended to be limiting, as any of modules 106, 108, 110, 112, 114, 116, 118, 120, 122 may provide more or less functionality than is described. For example, one or more of modules 106, 108, 110, 112, 114, 116, 118, 120, 122 may be eliminated, and some or all of its functionality may be provided by other ones of modules 106, 108, 110, 112, 114, 116, 118, 120, 122. As another example, processor 128 may be configured to execute one or more additional modules that may perform some or all of the functionality attributed below to one of modules 106, 108, 110, 112, 114, 116, 118, 120, 122.

Figure 2A:
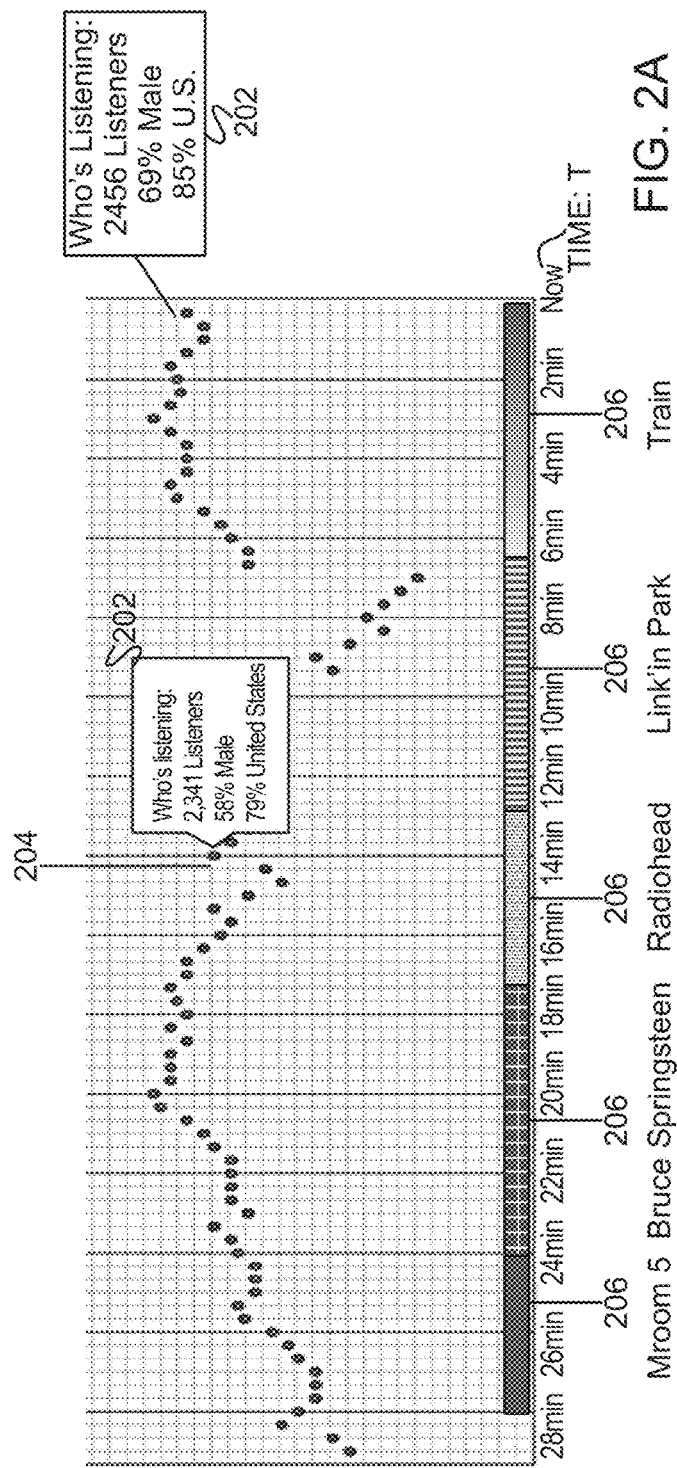
FIGS. 2A-2B illustrate various exemplary audience metrics.
Figure 2B:
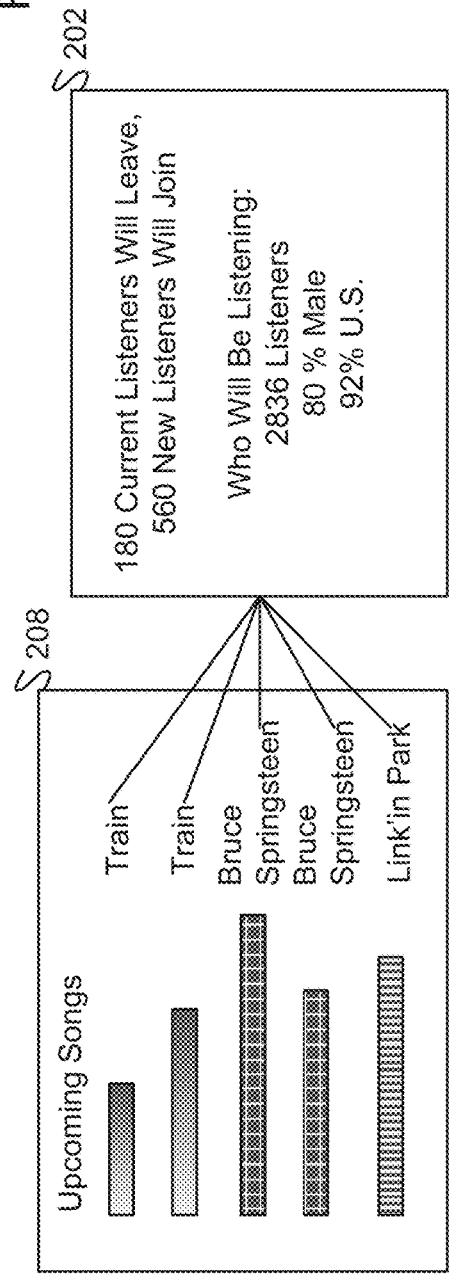

FIG. 2A-2B illustrates various exemplary audience metrics. As shown in FIG. 2A, several songs 206 by various artists were played in a 28 minute period ending at a current time T. The dots 204 demonstrate a number of users at various time points during that 28 minute period listened a song played at the time point. For example, at one time point, 2341 listeners listened to a by Radiohead, as shown. As shown, audience metrics 202 may be determined, e.g., by the audience metrics module 116, for these listeners: e.g., at that time point, an audience metric describing user gender may indicate that 58% of the 2341 listeners were male and another audience metric describing user geolocation may indicate that 79% of those 2341 listeners were listening in the United States. As also shown, at the current time T, the audience metrics, e.g., determined by audience metrics module 116, may indicate that 69% of the 2456 listeners are male and 85% of the 2456 listeners are listening in the United States.

FIG. 2B illustrates another example of determined audience metrics 202, e.g., by the audience metrics module 116. In this example, the audience metrics 202 may be determined for a set of broadcast content 208 (i.e., upcoming songs by various artists as shown) that will be streamed immediately after the current time T. As illustrated, the audience metrics may be determined to indicate that 180 current listeners will leave but 560 new listeners will join during the streaming of the set of upcoming songs. The determined audience metrics in this example may also indicate that 80% of the listeners that will be listening to the upcoming set of songs 208 are male and 92% will be listening in the United States.

Figure 3:
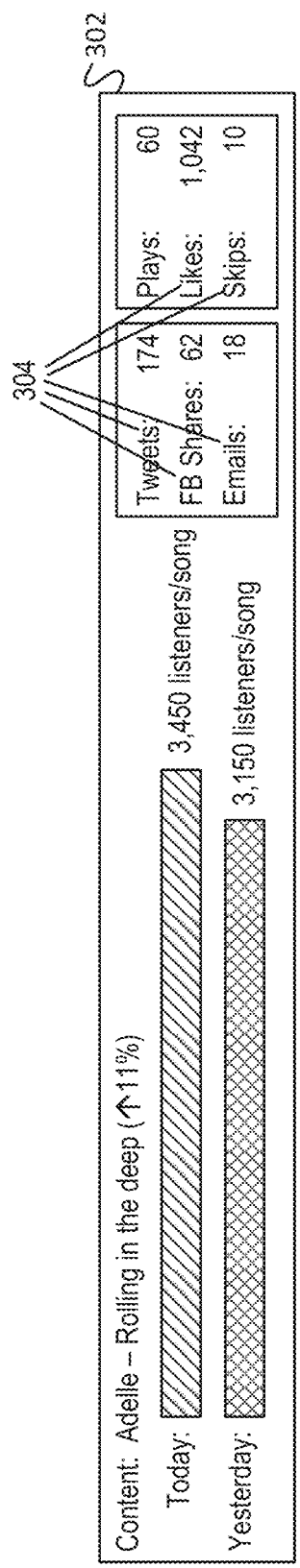
FIG. 3 illustrates various exemplary event metrics.

FIG. 3 illustrates various exemplary event metrics. As shown, several events 302, i.e. streaming of various songs, may be determined. For these events 302, various event metrics that describe user consumption of the broadcast content may be determined, as shown. For example, for the streaming of Rolling in the Deep by Adelle during a 24 hour of broadcast content (e.g., Today's broadcast, Yesterday's broadcast as shown), various even metrics 304 may be determined to indicate, such as, 174 times the song was tweeted, 62 users shared the song on the Facebook, 18 users emailed about the song, 1042 users liked the song on the Facebook and 10 users skipped the song during the streaming of the song, as illustrated.

FIG. 4 illustrates an example method 400 of providing crowd sourced metrics for broadcast content providers. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At operation 402, user consumption of broadcast content provided in multiple streams by multiple content providers may be monitored. In some implementations, operation 402 may be performed by a content consumption module the same as or similar to content consumption module 106 (shown in FIG. 1 and described herein).

At operation 404, user consumption information regarding the broadcast content may be obtained. In some examples, the obtained user consumption information may be stored in a database to facilitate historical views of user consumption of the broadcast content. In some implementations, operation 404 may be performed by a content consumption module the same as or similar to content consumption module 106 (shown in FIG. 1 and described herein).

At operation 406, one or more users may be determined as available users to consume broadcast content to be streamed by a content provider. In some implementations, operation 406 may be performed by an available user determination module the same as or similar to available user determination module 110 (shown in FIG. 1 and described herein).

At operation 408, content consumption metrics for individual available users may be determined based on their content consumption information, as obtained in operation 404. In some implementations, operation 408 may be performed by a content consumption metrics module the same as or similar to the content consumption metrics module 112 (shown in FIG. 1 and described herein).

At operation 410, audience metrics may be determined based on the content consumption metrics determined in operation 408. In some implementations, operation 410 may be performed by an audience metrics module the same as or similar to the audience metrics module 116 (shown in FIG. 1 and described herein).

FIG. 5 illustrates an exemplary method 500 of providing crowd sourced metrics for broadcast content providers. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At operation 502, user consumption of broadcast content provided in multiple streams by multiple content providers may be monitored. In some implementations, operation 502 may be performed by a content consumption module the same as or similar to content consumption module 106 (shown in FIG. 1 and described herein).

At operation 504, user consumption information regarding the broadcast content may be obtained. In some examples, the obtained user consumption information may be stored in a database to facilitate historical views of user consumption of the broadcast content. In some implementations, operation 504 may be performed by a content consumption module the same as or similar to content consumption module 106 (shown in FIG. 1 and described herein).

At operation 506, events within broadcast content may be determined. In some implementations, operation 506 may be performed by an event determination module 118 the same as or similar to audience metrics module 116 (shown in FIG. 1 and described herein).

At operation 508, event information for individual available users may be determined based on their content consumption information, as obtained in operation 504. In some implementations, operation 508 may be performed by an event information module 120 the same as or similar to the event information module 120 (shown in FIG. 1 and described herein).

At operation 510, event metrics may be determined based on the event information determined in operation 508. In some implementations, operation 510 may be performed by an event metrics module the same as or similar to the event metrics module 122 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer-implemented method, comprising:
dynamically obtaining broadcast content consumption information during playback of a broadcast stream associated with broadcast content, wherein the broadcast content consumption information corresponds to a user at an event that is associated with the broadcast content;
identifying event content consumption information for a plurality of events taking place during a plurality of broadcast streams, wherein identifying the event content consumption information includes using metadata detection, ID tag detection, header detection, voice recognition, image analysis, motion detection, or signal detection;
dynamically determining event metrics over at least a segment of the broadcast stream based on the broadcast content consumption information, wherein an event metric includes an indication of a duration of time of the broadcast event in which a display of a device of the user is on;
determining a commonality among one or more additional users, wherein the one or more additional users are associated with the broadcast content, and wherein the one or more additional users are likely to interact with additional broadcast content over a future period of time;
executing a trained machine-learning model, the trained machine-learning model generates predictions of future event metrics for one or more events associated with additional broadcast content over the future period of time, wherein the trained machine-learning model uses scaling, aggregation, regression, standard deviation, summarization, categorization, or probability testing on the broadcast content consumption information to generate the predictions, wherein the future event metrics are based on the event metrics, and wherein the future event metrics are associated with the commonality among the user and the one or more additional users; and
facilitating a transmission that includes the future event metrics, wherein when the future event metrics are received at a content provider, the future event metrics are used by the content provider to continually optimize quantified consumption of the additional broadcast content by the user and the one or more additional users.

2. The method of claim 1, wherein the broadcast content consumption information includes time-shift information indicating time-shifts by the user during consumption of the broadcast content associated with the event.

3. The method of claim 1, further comprising:
determining estimated event metrics using the event content consumption information, wherein the estimated event metrics quantify consumption of the plurality of broadcast streams associated with the plurality of events.

4. The method of claim 3, wherein the estimated event metrics identify quantities of social media interactions associated with content objects related to the plurality of events.

5. The method of claim 1, wherein the broadcast content is on demand content.

6. A computer-implemented system, comprising:
one or more processors; and
a non-transitory computer readable storage medium including instructions that, when executed by the one or more processors, cause the one or more processors to perform operations including:
dynamically obtaining broadcast content consumption information during playback of a broadcast stream associated with broadcast content, wherein the broadcast content consumption information corresponds to a user at an event that is associated with the broadcast content;
identifying event content consumption information for a plurality of events taking place during a plurality of broadcast streams, wherein identifying the event content consumption information includes using metadata detection, ID tag detection, header detection, voice recognition, image analysis, motion detection, or signal detection;
dynamically determining event metrics over at least a segment of the broadcast stream based on the broadcast content consumption information, wherein an the event metric includes an indication of a duration of time of the broadcast event in which a display of a device of the user is on;
determining a commonality among one or more additional users, wherein the one or more additional users are associated with the broadcast content, and wherein the one or more additional users are likely to interact with additional broadcast content over a future period of time;
executing a trained machine-learning model, the trained machine-learning model generates predictions of future event metrics for one or more events associated with additional broadcast content over the future period of time, wherein the trained machine-learning model uses scaling, aggregation, regression, standard deviation, summarization, categorization, or probability testing on the broadcast content consumption information to generate the predictions, wherein the future event metrics are based on the event metrics, and wherein the future event metrics are associated with the commonality among the user and the one or more additional users; and
facilitating a transmission that includes the future event metrics, wherein when the future event metrics are received at a content provider, the future event metrics are used by the content provider to continually optimize quantified consumption of the additional broadcast content by the user and the one or more additional users.

7. The system of claim 6, wherein the broadcast content consumption information includes time-shift information indicating time-shifts by the user during consumption of the broadcast content associated with the event.

8. The system of claim 6, wherein the operations further include:
determining estimated event metrics using the event content consumption information, wherein the estimated event metrics quantify consumption of the plurality of broadcast streams associated with the plurality of events.

9. The system of claim 8, wherein the estimated event metrics identify quantities of social media interactions associated with content objects related to the plurality of events.

10. The system of claim 6, wherein the broadcast content is on demand content.

11. A non-transitory computer readable storage medium comprising instructions that, when executed by one or more processors, cause the one or more processors to perform operations including:

dynamically obtaining broadcast content consumption information during playback of a broadcast stream associated with broadcast content, wherein the broadcast content consumption information corresponds to a user at an event that is associated with the broadcast content;

identifying event content consumption information for a plurality of events taking place during a plurality of broadcast streams, wherein identifying the event content consumption information includes using metadata detection, ID tag detection, header detection, voice recognition, image analysis, motion detection, or signal detection;

dynamically determining event metrics over at least a segment of the broadcast stream based on the broadcast content consumption information, wherein an event metric includes an indication of a duration of time of the broadcast event in which a display of a device of the user is on;

determining a commonality among one or more additional users, wherein the one or more additional users are associated with the broadcast content, and wherein the one or more additional users are likely to interact with the additional broadcast content over a future period of time;

executing a trained machine-learning model, the trained machine-learning model generates predictions of future event metrics for one or more events associated with additional broadcast content over the future period of time, wherein the trained machine-learning model uses scaling, aggregation, regression, standard deviation, summarization, categorization, or probability testing on the broadcast content consumption information to generate the predictions, wherein the future event metrics are based on the event metrics, and wherein the future event metrics are associated with the commonality among the user and the one or more additional users; and facilitating a transmission that includes the future event metrics, wherein when the future event metrics are received at a content provider, the future event metrics are used by the content provider to continually optimize quantified consumption the additional broadcast content by the user and the one or more additional users.

12. The non-transitory computer readable storage medium of claim 11, wherein the broadcast content consumption information includes time-shift information indicating time-shifts by the user during consumption of the broadcast content associated with the event.

13. The non-transitory computer readable storage medium of claim 11, wherein the operations further include:

determining estimated event metrics using the event content consumption information, wherein the estimated event metrics quantify consumption of the plurality of broadcast streams associated with the plurality of events.

14. The non-transitory computer readable storage medium of claim 13, wherein the estimated event metrics identify quantities of social media interactions associated with content objects related to the plurality of events.

15. The non-transitory computer readable storage medium of claim 11, wherein the broadcast content is on demand content.

* * * * *